US007446647B2

(12) United States Patent
Helgeson

(10) Patent No.: US 7,446,647 B2
(45) Date of Patent: Nov. 4, 2008

(54) STATE VALIDATION USING BI-DIRECTIONAL WIRELESS LINK

(75) Inventor: Michael A. Helgeson, Eagan, MN (US)

(73) Assignee: Honeywell International Inc., Morristown, NJ (US)

(*) Notice: Subject to any disclaimer, the term of this patent is extended or adjusted under 35 U.S.C. 154(b) by 88 days.

(21) Appl. No.: 11/276,583

(22) Filed: Mar. 6, 2006

(65) Prior Publication Data

US 2006/0152335 A1 Jul. 13, 2006

Related U.S. Application Data

(63) Continuation of application No. 09/311,092, filed on May 13, 1999, now Pat. No. 7,015,789.

(51) Int. Cl.
*H04Q 5/22* (2006.01)
*G05B 23/02* (2006.01)

(52) U.S. Cl. ...................... 340/10.1; 340/10.4; 340/3.1; 340/3.4

(58) Field of Classification Search ................ 340/10.1, 340/10.4, 3.1, 3.4, 7.32, 313, 825.72, 825.49, 340/307, 309.15
See application file for complete search history.

(56) References Cited

U.S. PATENT DOCUMENTS 3,643,183 A 2/1972 Geffe
3,715,693 A 2/1973 Fletcher et al.
3,758,885 A 9/1973 Voorman et al.
4,264,874 A 4/1981 Young
4,529,947 A 7/1985 Biard et al.
4,549,169 A 10/1985 Moura et al.
4,614,945 A 9/1986 Brunius et al.
4,812,785 A 3/1989 Pauker
4,843,638 A 6/1989 Walters
4,948,425 A 8/1990 Watanabe et al.
5,097,671 A * 3/1992 Jeong-Hun .................. 62/126
5,287,109 A * 2/1994 Hesse ......................... 341/176
5,322,034 A * 6/1994 Willham et al. .......... 340/10.41
5,382,948 A 1/1995 Richmond
5,390,206 A * 2/1995 Rein et al. .................. 375/130

(Continued)

FOREIGN PATENT DOCUMENTS

CH 673184 2/1990

(Continued)

OTHER PUBLICATIONS

"Image Rejection in Mixers," copyright AAA, 1996.

(Continued)

*Primary Examiner*—Brian Zimmerman
*Assistant Examiner*—Nam V Nguyen
(74) *Attorney, Agent, or Firm*—Kris T. Fredrick

(57) ABSTRACT

Building monitoring and control systems including bi-directional radio frequency links between master and remote units wherein the remote units operate in a low power, non-receiving state a majority of the time is disclosed. The bi-directional capability allows coordinated scheduling which aids in allowing the remote units to transmit data only at periodic time intervals to extend battery life. The bi-directional capabilities also allow for re-read requests for alarm validation and for putting remote units in armed and disarmed states for power conservation.

22 Claims, 5 Drawing Sheets

U.S. PATENT DOCUMENTS

| | | | | |
|---|---|---|---|---|
| 5,392,003 | A | | 2/1995 | Nag et al. |
| 5,428,602 | A | | 6/1995 | Kemppainen |
| 5,428,637 | A | | 6/1995 | Oliva, Jr. et al. |
| 5,430,409 | A | | 7/1995 | Buck et al. |
| 5,438,329 | A | | 8/1995 | Gastouniotis et al. |
| 5,451,898 | A | | 9/1995 | Johnson |
| 5,481,259 | A | | 1/1996 | Bane |
| 5,594,447 | A | | 1/1997 | Usui et al. |
| 5,595,342 | A | * | 1/1997 | McNair et al. ................ 236/51 |
| 5,642,071 | A | | 6/1997 | Sevenhans et al. |
| 5,659,303 | A | | 8/1997 | Adair, Jr. |
| 5,663,774 | A | | 9/1997 | Baik |
| 5,726,603 | A | | 3/1998 | Chawla et al. |
| 5,745,049 | A | | 4/1998 | Akiyama et al. |
| 5,745,849 | A | | 4/1998 | Britton |
| 5,767,664 | A | | 6/1998 | Price |
| 5,767,791 | A | * | 6/1998 | Stoop et al. ............ 340/870.11 |
| 5,782,036 | A | * | 7/1998 | Bertieri et al. ................. 49/25 |
| 5,809,013 | A | | 9/1998 | Kackman |
| 5,822,544 | A | | 10/1998 | Chaco et al. |
| 5,825,327 | A | | 10/1998 | Krasner |
| 5,847,623 | A | | 12/1998 | Hadjichristos |
| 5,905,442 | A | | 5/1999 | Mosebrook et al. |
| 5,963,650 | A | | 10/1999 | Simionescu et al. |
| 5,973,613 | A | | 10/1999 | Reis et al. |
| 6,034,603 | A | * | 3/2000 | Steeves ..................... 340/10.2 |
| 6,052,600 | A | | 4/2000 | Fette et al. |
| 6,058,137 | A | | 5/2000 | Partyka |
| 6,084,530 | A | | 7/2000 | Pidwerbetsky et al. |
| 6,087,930 | A | * | 7/2000 | Kulka et al. ................. 340/447 |
| 6,091,715 | A | | 7/2000 | Vucetic et al. |
| 6,175,860 | B1 | | 1/2001 | Gaucher |
| 6,198,394 | B1 | | 3/2001 | Jacobsen et al. |
| 6,259,399 | B1 | | 7/2001 | Krasner |
| 6,275,166 | B1 | | 8/2001 | del Castillo et al. |
| 6,353,846 | B1 | | 3/2002 | Fleeson |
| 6,366,622 | B1 | | 4/2002 | Brown et al. |
| 6,414,963 | B1 | | 7/2002 | Gemar |
| 6,624,750 | B1 | | 9/2003 | Marman et al. |
| 6,768,901 | B1 | | 7/2004 | Osborn et al. |
| 6,785,255 | B2 | | 8/2004 | Sastri et al. |
| 6,823,181 | B1 | | 11/2004 | Kohno et al. |
| 6,836,506 | B2 | | 12/2004 | Anderson |
| 6,901,066 | B1 | | 5/2005 | Helgeson |
| 2002/0011923 | A1 | | 1/2002 | Cunningham et al. |
| 2002/0085622 | A1 | | 7/2002 | Dhar et al. |
| 2002/0141479 | A1 | | 10/2002 | Garcia-Luna-Aceves et al. |
| 2003/0053555 | A1 | | 3/2003 | McCorkle et al. |
| 2003/0198280 | A1 | | 10/2003 | Wang et al. |
| 2004/0253996 | A1 | | 12/2004 | Chen et al. |
| 2005/0281215 | A1 | | 12/2005 | Budampati et al. |

FOREIGN PATENT DOCUMENTS

| | | |
|---|---|---|
| DE | 3529127 | 2/1987 |
| DE | 19548650 | 6/1997 |
| DE | 4344172 | 10/2006 |
| EP | 0574230 | 12/1993 |
| EP | 0607562 | 7/1994 |
| EP | 0893931 | 1/1999 |
| FR | 2592977 | 7/1987 |
| GB | 2273593 | 6/1994 |
| WO | 0070572 | 11/2000 |

OTHER PUBLICATIONS

"Medium Access Control (MAC) and Physical (PHY) Specifications," ANSI/IEEE Std 802.11, pp. 177-179, 1999.

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Ciruits, vol. 32, No. 5, pp. 722-729, May 1997.

Cheng et al., "TPS: A Time-Based Positioning Scheme for Outdoor Wireless Sensor Networks," IEEE INFOCOM 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

http://wiki.personaltelco.net/index.cgi/PhasedArray?action=print, "Phased Array—Personal Telco Wiki," 3 pages, May 2, 2005.

http://www.bamboweb.com/articles/o/s/OSI_model.html, "Bambooweb OSI model,"60 Bambooweb Dictionary, 5 pages, printed May 23, 2005.

http://www.dailywireless.org/modules.php?name=News&file=article&sid=871, "Location By Triangulation—Not," Daily Wireless, 2 pages, printed May 2, 2005.

http://www.unstrung.com/document.asp?site=unstrung&doc_id15069&page_number=1, 11 pages, printed May 2, 2005.

http://www.zigbee.org/en/about/faq.asp, "Wireless Control That Simply Works," ZigBee Alliance, 8 pages, printed Feb. 2, 2005.

Jung et al., "Improving IEEE 802.11 Power Saving Mechanism," 6 pages, Jul. 7, 2004.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, no. 8, pp. 1344-1354, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Consideractions for Direct-Conversion Receivers," IEEE Transactions on Circuits and Systems—II: Analog and Digital Signal Processing, vol. 44, No. 6, pp. 428-435, Jun. 1997.

Rofougan et al., "A 1 GHz CMOS RF Front-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al., "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp. 1944-1950, Dec. 1991.

* cited by examiner

STATE VALIDATION USING BI-DIRECTIONAL WIRELESS LINK

This application is a continuation of U.S. application Ser. No. 09/311,092 filed May 13, 1999.

CROSS REFERENCE TO CO-PENDING APPLICATIONS

The present application is related to U.S. patent application Ser. No. 09/311,242 filed May 13, 1999, entitled "Output Buffer With Independently Controllable Current Mirror Legs"; U.S. patent application Ser. No. 09/311,105, filed May 13, 1999, entitled "Differential Filter with Gyrator"; U.S. patent application Ser. No. 09/311,234, filed May 13, 1999, entitled "Compensation Mechanism For Compensating Bias Levels Of An Operation Circuit In Response To Supply Voltage Changes"; U.S. patent application Ser. No. 09/311,246, filed May 13, 1999, entitled "Filter With Controlled Offsets For Active Filter Selectivity and DC Offset Control"; U.S. patent application Ser. No. 09/311,250, filed May 13, 1999, entitled "Wireless System With Variable Learned-In Transmit Power"; and U.S. patent application Ser. No. 09/311,014, filed May 13, 1999, entitled "Wireless Control Network With Scheduled Time Slots", all of which are assigned to the assignee of the present invention and incorporated herein by reference.

FIELD OF THE INVENTION

The present invention relates generally to building monitoring and control for commercial and residential use. More specifically, the present invention relates to building monitoring and control systems such as security, HVAC or other monitoring systems that utilize wireless, bi-directional radio frequency communication between master units and remote units. In particular, the present invention relates to remote units having low transmission duty cycles, low power consumption, and alarm validation capabilities.

BACKGROUND OF THE INVENTION

Building monitoring and control systems including security system, HVAC and other monitoring and control systems are in increasing use in both commercial buildings and residential dwellings. For security systems, the increasing use is due in part to a long-term perception of increasing crime rates along with increasing awareness of the availability of building monitoring and security systems. For HVAC systems, the increasing use is due in part to the desire to reduce heating and cooling costs, and to save energy.

A building monitoring and/or control system typically includes a variety of remote units coupled to detection devices and at least one master unit which typically resides in a central location in the building and can include annunciation functions and reporting functions to another location such as a central reporting service or police department. Remote units have, in the past, been hard wired to the master unit. For example, in a security system, reed switches or Hall effect switches are often disposed near magnets located near doors and door jambs, with a door opening making or disrupting continuity, with the resulting signal being received by the master unit.

In hardwired systems the remote units and the detection devices may be nearly one in the same. For example, the detection device may be a foil trace on a glass pane and the remote unit may be wire terminals with optional signal conditioning equipment leading to a wire pair connected to the master unit. Hard wired units can be installed most easily in new construction, where running wire pairs is easier than in existing buildings. Installing hard-wired systems can be very expensive in existing buildings due in part to the labor costs of snaking wires through existing walls and ceilings. In particular, on a point-by-point basis, retrofitting residential dwellings can be expensive because houses are often not designed to be continually changed, as are many office buildings. For example, most houses do not have dropped ceilings and utility closets at regular intervals. Houses can have higher aesthetic expectations than commercial office buildings, requiring greater care in installing and concealing wiring.

Wireless security systems have become increasingly common. Existing systems use radio frequency transmission, often in the 400 MHz region. Wireless systems can greatly reduce the need for wiring between remote and master unit or units. In particular, wireless systems can communicate between the remote units and the master units without wiring. Remote units still require power to operate, and can require wiring to supply that power, which can add a requirement for power wiring where the power had been provided in hard wired systems over the wiring used to communicate between remote units and the master unit. The power requirement can partially negate the wireless advantage of radio frequency units, as some wiring is still required. The power supply wiring requirement is often eliminated with the use of batteries. Battery life is largely a function of power consumption of the remote units. The power consumption is dependent upon both the electronics and upon the duty cycle of the unit.

Current wireless systems typically utilize remote units which can only transmit and master units which only receive. Remote units often transmit sensor data for needlessly long periods, and at higher power than is required, as there is no bi-directional capability, and therefore no way for the master unit to acknowledge receipt of the first remote unit message, or a low power message. Sometimes, the remote units transmit a health status message at regular periodic intervals. The health status message gives the health of the remote unit, sometimes includes sensor data, and informs the master unit that the remote unit is still functioning. The periodic transmissions can be scheduled at the remote units by DIP switches or local programming of the remote units, but typically cannot be adjusted by the master unit as the communication between master and remote is unidirectional and the master has no way to adjust the timing of transmissions of the remote units. Since there is no coordination between the transmission times of the remote units, collisions can occur between remote unit transmissions, which may reduce the overall reliability of the system. To increase the probability that a particular remote unit transmission is received by the master, the remote unit may make the same transmission many times. However, this can significantly increase the power consumed by the remote units.

Another limitation is that false alarms can be generated. False alarms undermine the credibility of real alarms and can cost money to respond to. For security systems, private security firms often charge to investigate alarms reported to them. Many municipalities charge large fees for false alarms that are reported to police departments. Too many false alarms can result in all or part of a security system to be ignored or turned off entirely. For HVAC systems, false alarms can cause, for example, heat to be applied even if it is not desired. As can be seen, this can decrease the efficiency of the HVAC system.

What would be desirable, therefore, is a bi-directional wireless security, HVAC or other building monitoring system that allows communication between the master and remote units for increased reliability. What would also be desirable is a system that has one or more low power modes for conserving valuable power resources.

SUMMARY OF THE INVENTION

The present invention includes a building monitoring and/or control system that includes bi-directional radio frequency links between master and remote units wherein the remote units preferably operate in a low power, non-transceiving state a majority of the time. The system can include at least one master unit and a plurality of remote units, the remote units being typically coupled to sensors for measuring and/or controlling security or building environment variables. The remote units in most systems can operate in a low power consumption state in which the unit can neither transmit nor receive, in a receive state in which the unit consumes more power and can receive transmissions from the master unit, and in a transmit state in which the unit consumes more power and can transmit messages to the master unit. Some embodiments include armed states in which the remote unit can sense and transmit data, and disarmed states in which the remote unit cannot, in combination, sense and transmit data. Disarmed states can provide a low power consumption state in which power is consumed neither for sensing variables nor for transmitting data.

In some embodiments, remote units are in a receive state only for a period after transmitting. In some embodiments, the remote units are in a receive state only after transmitting and are in a receive state periodically, often waiting for polling by a master unit. Some remote units transmit data at periodic intervals and transmit data after the occurrence of an event. Events can include timeout events, sensor change events, and polling events. In preferred embodiments, remote units await acknowledgment from a master unit after a transmission. After receipt of an acknowledgment, the remote units preferably do not further transmit the same message.

Remote unit sensors can be used to detect state changes in security devices such as door and window switches. Sensors can also be used to measure analog or continuously variable properties of a building environment such as temperature, humidity, airflow, and hot water flow. In some embodiments, upon expiration of a timer, building data such as temperature is reported as an event in the same manner as a door opening.

In one process suitable for executing in a remote unit, the remote unit: determines a time for communication with a master; waits in a low power non-receive and non-transmit state for either a timeout to arrive or an event to occur; changes to a transmitting state upon detecting the event and transmits data to the master unit; changes to a transmitting state upon occurrence of the timeout and transmits data to the master unit; waits for acknowledgement from the master unit after transmitting data; and resumes the low power state. If acknowledgement is not received, in preferred embodiments, retransmission is performed, perhaps at a higher power level. In one process, timing information for the next transmission is received by the remote unit along with the acknowledgment. The acknowledgement can be used to re-synchronize the timer of the remote unit with the timer of the master unit. In one process, frequency information relating to the next transmission is received by the remote unit along with the acknowledgment.

In one system, remote units have an armed state in which the sensors can sense and the unit can transmit and a disarmed state in which, in combination, the sensors cannot both sense and the remote unit transmit. In the disarmed state, the sensor cannot sense and/or the transmitter cannot transmit. In the previously described disarmed state, in some embodiments, the sensor functionality is disabled to save energy. In some embodiments, the transmitting functionality is disabled to prevent transmissions even when otherwise transmittable events occur. For example, in a disarmed state, a door reed switch may still sense continuity, but the door opening will not be transmitted, to save on energy and extend battery life when the door opening is not a concern. In some embodiments, both sensor and transmitting functionality are disabled to save on energy and extend battery life. It is contemplated that the sensor state may be reconfigured on the fly depending on the current mode of the system.

In some systems, the master unit, upon receiving an event from a remote unit, can request a re-read of the sensor to validate the event before taking further action. A decision whether to request a re-read can be based on the sensor type and the current mode of the system. In one embodiment, the sensor type is transmitted along with the data. The sensor type is determined in another embodiment by the master looking up the remote unit ID and determining the sensor type or types associated with it. The sensor type is determined in another embodiment by the master looking up the sensor type in a previously built table. The table can be built from data obtained at initialization of either the remote units or the master unit. The information associated with a remote unit sensor can include whether to re-read, how long to wait before a re-read, and how many times to re-read. The validation functionality can greatly reduce false alarms.

DETAILED DESCRIPTION OF THE INVENTION

Figure 1:
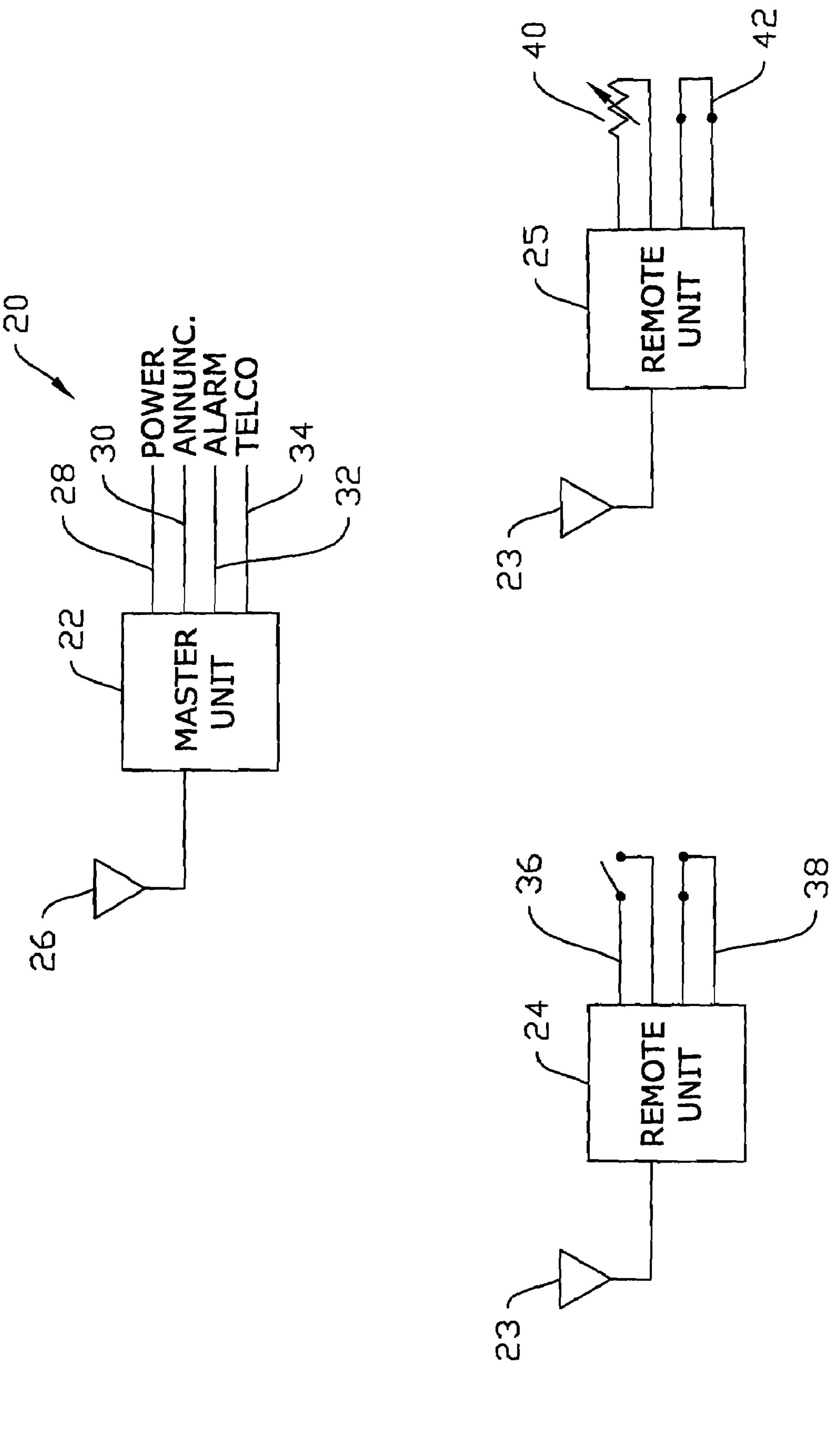
FIG. 1 is a block diagram of a wireless control system having a master unit and two remote units.

FIG. 1 illustrates a wireless control system 20 including a master unit 22 and two wireless remote units 24 and 25. Master unit 22 includes an antenna 26, a power supply line 28, annunciator panel output line 30, alarm device output line 32, and telephone line 34. A building monitoring and/or control system according to the present invention typically has at least one master unit which is commonly powered with AC line power but can be battery powered, or have battery back-up power. Remote unit 24 includes an antenna 23 and is coupled to two discrete sensor inputs 36 and 38. Sensor input 36 is a normally open sensor and sensor input 38 is a normally closed sensor. Sensors 36 and 38 can be reed switches or Hall effect devices coupled to magnets used to sense door and window opening and closing. Sensor 38 can be a foil continuity sensor used to detect glass breakage. Remote unit 25 includes antenna 23 and two analog sensors 40 and 42. Sensor 40 is a variable resistance device and security sensor 42 is a variable voltage device. Analog sensors can measure variables such as vibration, noise, temperature, movement, and pressure. Sensors typically sense or measure variables and output data. The data can be binary or discrete, meaning on/off. Data can also be continuous or analog, meaning having a range of values. Analog data can be converted to digital form by using an A/D converter.

Examples of sensors include intrusion sensors such as door switches, window switches, glass breakage detectors, and motion detectors. Safety sensors such as smoke detectors, carbon monoxide detectors, and carbon dioxide detectors are also examples of sensors suitable for use with the current invention. Other sensors include temperature sensors, water detectors, humidity sensors, light sensors, damper position sensors, valve position sensors, electrical contacts, BTU totalizer sensors, and water, air and steam pressure sensors. In addition to sensors, output devices can also be included with the present invention. Examples of output devices include valve actuators, damper actuators, blind positioners, heating controls, and sprinkler head controls. In one embodiment, remote devices having output capability utilize circuitry identical or similar to the circuitry used for sensors, particularly for the communication and controller portions of the devices. Remote devices coupled to output devices typically are hard wired to power sources as they typically consume more power than the sensor input devices. For this reason, remote devices having output devices may not benefit as much from the power saving features of the present invention.

A building monitoring and/or control system according to the present invention can have a large number of remote units which can be spread over an area covered by the RF communication. One system can have remotes located about 5,000 feet (of free space) away from the master unit. The actual distance may be less due to intervening walls, floors and electromagnetic interference in general. Systems can have repeater units as well, units that receive and re-transmit messages to increase the area covered. In some systems, repeaters have a receiver coupled to a transmitter by a long, hard-wired link, allowing separate areas to be covered by one master unit.

Figure 2:
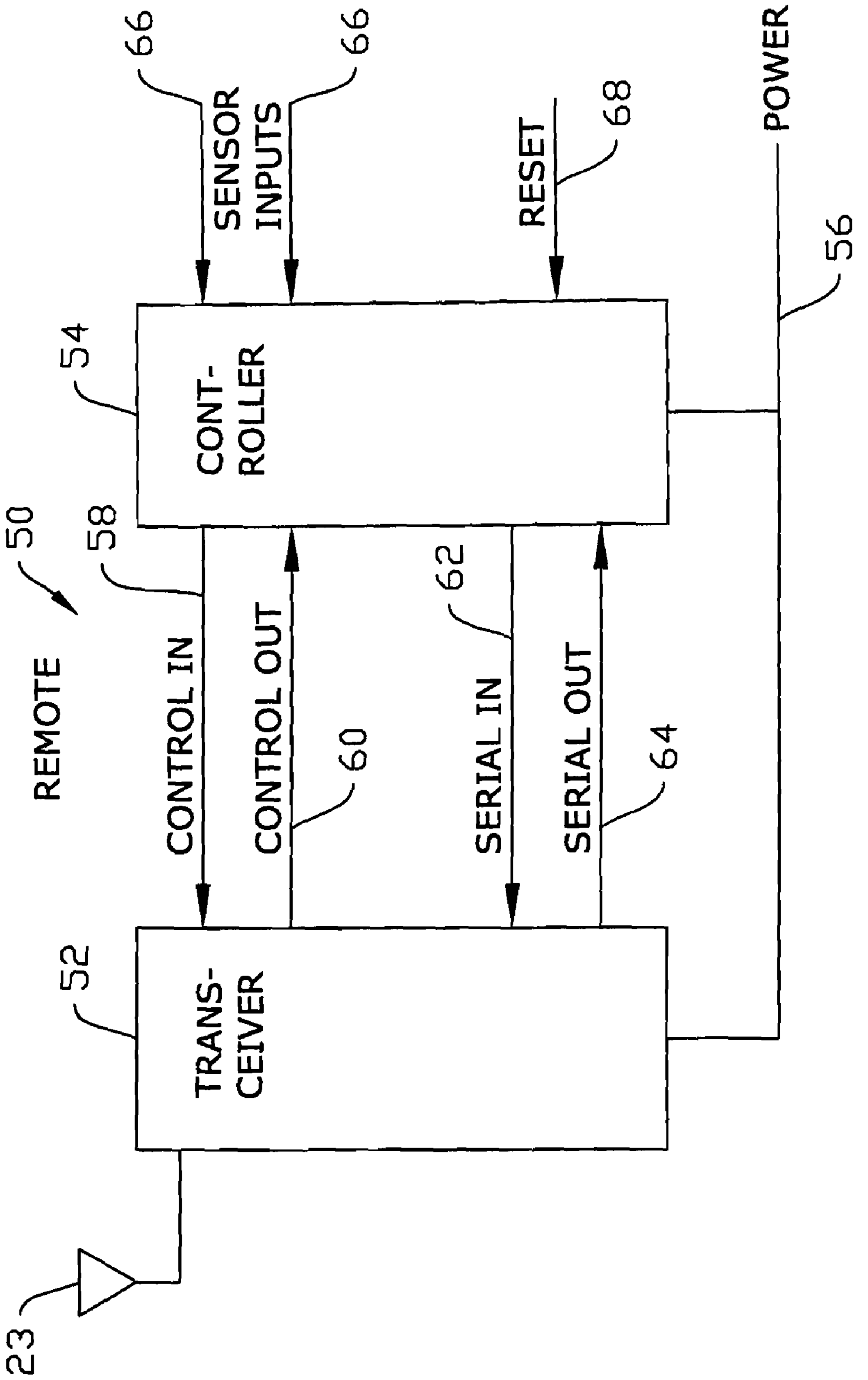
FIG. 2 is a block diagram of a wireless remote unit having a transceiver coupled to a controller.

Referring now to FIG. 2, a remote unit 50 is illustrated in further detail, including antenna 23, a transceiver 52, and a controller 54. Transceiver 52 and controller 54 are each coupled to power source 56 in the embodiment illustrated. Controller 54 includes a programmable microprocessor such as the PIC microprocessor in one embodiment. In another embodiment, the controller is formed primarily of a once-programmable or writeable state machine. Transceiver 52 is preferably a UHF transceiver, for example transmitting and receiving in the 400 or 900 MHz range. Transceiver 52, in one embodiment, can be set to transmit and receive on different frequencies and to rapidly switch between frequencies. While transceiver 52 can include the capability to transmit and receive simultaneously, in a preferred embodiment, transceiver 52 can only either receive or transmit, but not both at the same time. In the embodiment illustrated, controller 54 is coupled to transceiver 52 with control input line 58, control output line 60, serial input line 62, and serial output line 64.

Control input line 58 can be used to reset the transceiver, to set modes, and to set transmit and receive frequencies. Control output line 60 can be used by signal controller 54 to determine when communication receptions or transmissions have been completed. Serial input line 62 can be used to feed messages to be transmitted to transceiver 52 as well as frequencies to be used and other control parameters. Serial output line 64 can be used to provide messages received from transceiver 52 to controller 54 and can be used to convey information about signal strength to controller 54. The controller and serial lines can of course be used for any purpose and the uses discussed are only a few examples of such uses in one embodiment. In some embodiments, the serial lines are used to convey both status and control data.

Remote unit 50 can also include sensor input lines 66 for coupling to security sensors and other devices. A reset line 68 can be coupled to a reset button to reset remote unit 50 when re-initialization of the unit is desired, such as at the time of installation or after battery changes. In some embodiments, battery power resumption serves as the reset function. A power line 56 is illustrated supplying both transceiver 52 and controller 54. In some embodiments, power is supplied directly to only the controller portion or the transceiver portion, with the controller portion supplied from the transceiver portion or visa versa. In the embodiment illustrated, controller 54 and transceiver 52 are shown separately for purposes of illustrating the present invention. In one embodiment, both controller 54 and transceiver 52 are included on the same chip, with a portion of the gates on board the chip dedicated for use as controller logic in general or used as a user programmable microprocessor in particular. In one embodiment, a PIC microprocessor is implemented on the same chip as the transceiver using CMOS logic and the PIC microprocessor is user programmable in an interpreted BASIC or JAVA language.

Figure 3:
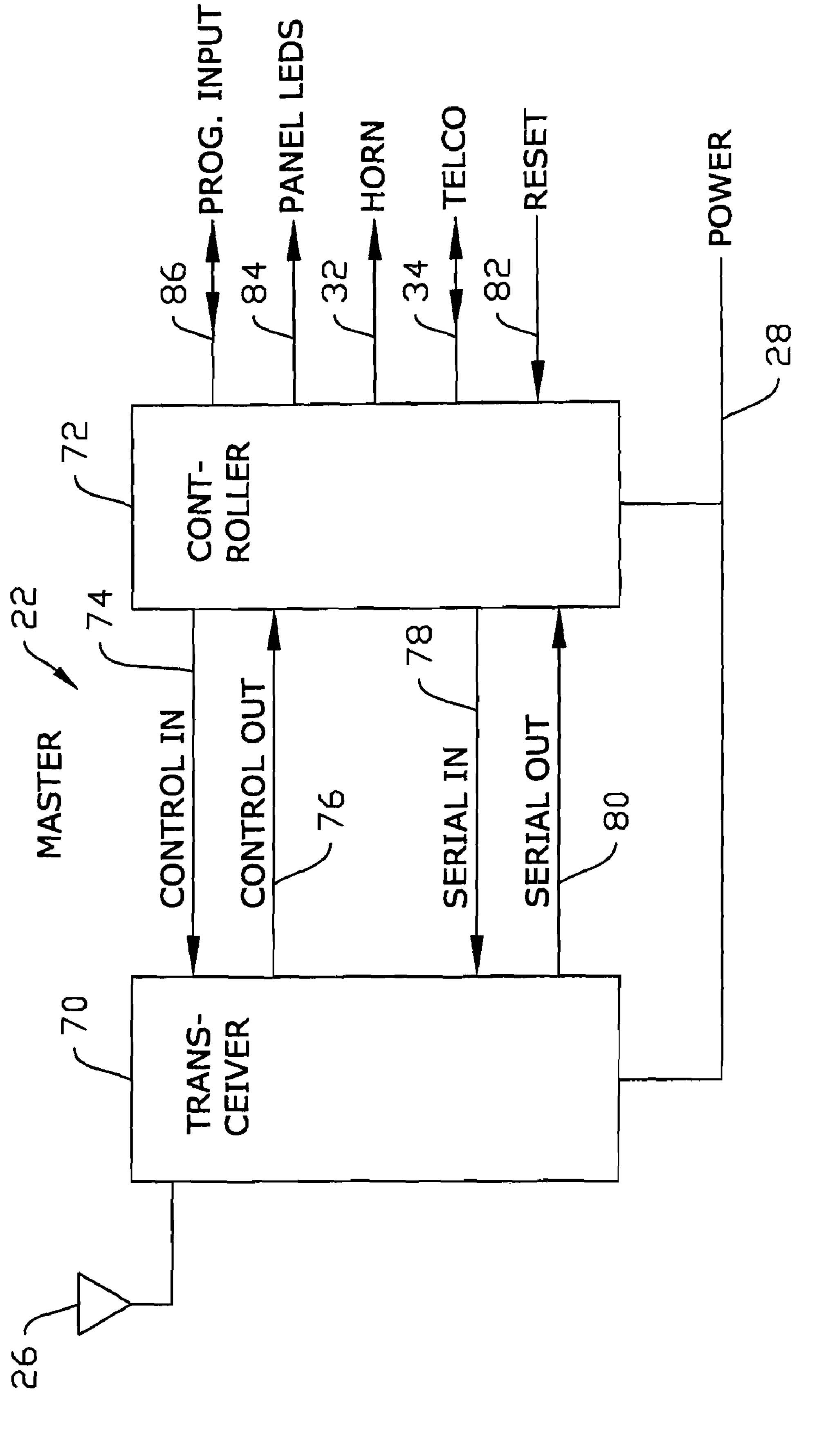
FIG. 3 is a block diagram of a master unit having a transceiver coupled to a controller.

Referring now to FIG. 3, master unit 22 is illustrated, including a transceiver portion 70 and a controller portion 72. Master unit 22 includes control lines 74 and 76 and serial lines 78 and 80. Reset line 82 is included in the embodiment illustrated as is a programmable input line 86, a panel LED output line 84, horn output line 32 and telephone line 34. Programmable input line 86 can be used for many purposes, including down loading control logic, inputting keyboard strokes, and inputting lines of BASIC or JAVA code to be interpreted and executed. Panel LED line 84 can be used to control panel-mounted LEDs giving status information. Horn line 32 can be used to activate alarm horns or lights. Telephone line 34 can be used for automatic dial out purposes to report security breaches to a reporting service or to the police.

In one embodiment, master unit 22 and remote unit 50 share a common chip containing the transceiver and controller logic. In one embodiment, the transceiver and controller are both on board the same chip used in the remote units but the controller portion is supplanted, replaced, or augmented by additional programmable controller functionality such a personal computer. In many embodiments of the present invention, the master controller or controllers may require additional programmable functionality relative to the functionality required on the remote units.

In one embodiment of the present invention, the transceiver portion of the remote unit can operate in at least three modes. In one mode, the transceiver operates in a very low power "sleep" mode, wherein the transceiver is neither transmitting nor receiving. The transceiver can be awakened from the sleep mode by external control signals, such as provided by control lines coming from the control logic portion of the remote unit. In one embodiment of the invention, only the controller can change the state of the transceiver through the control lines such as control lines 58 and 60 in FIG. 2. In a preferred embodiment, at least three events can awaken the transceiver from the sleep mode. One event is the occurrence of a sensor data change, such as a door switch opening, or a significant percentage change of an analog variable. Another event is the lapse of a preset time interval, such as the lapse of the time interval between scheduled health status transmissions by the remote, or between scheduled health status polls by the master unit for which the remote desires to be awake. Yet another event is the resetting of the remote, such as resetting of reset line 68 in FIG. 2.

In one embodiment, remote units can be configured or programmed to transmit sensor data only on a timeout occurrence or on a change occurrence. For example, a temperature sensor may be configured to transmit every half-hour or upon a one (1) degree change from the last transmission. This can greatly reduce power consumption.

In one embodiment, the controller portion of the remote unit can run in a low power mode, but is able to processes external signals and interrupts. In one embodiment, timing is handled by timers on board the chip housing the transceiver and controller. In this embodiment, the controller logic is able to process timing functions while in a low power mode. In another embodiment, timing is handled by circuitry external to the microprocessor, with the microprocessor being able to respond to interrupts but not being able to handle the timing functionality. In this embodiment, the timing can be handled by an RC timer or a crystal oscillator residing external to the microprocessor, allowing the microprocessor to lie in a very low power consumption mode while the external timing circuitry executes the timing functionality. In one embodiment, the timing and microprocessor circuitry both reside on the same chip, but can run in different power consumption modes at the same time. In one embodiment, the remote, not including timing circuitry, initializes in a normal power consumption mode, sleeps in a very low power consumption mode, which, when interrupted, executes in a normal power consumption mode while transmitting or receiving.

Figure 4:
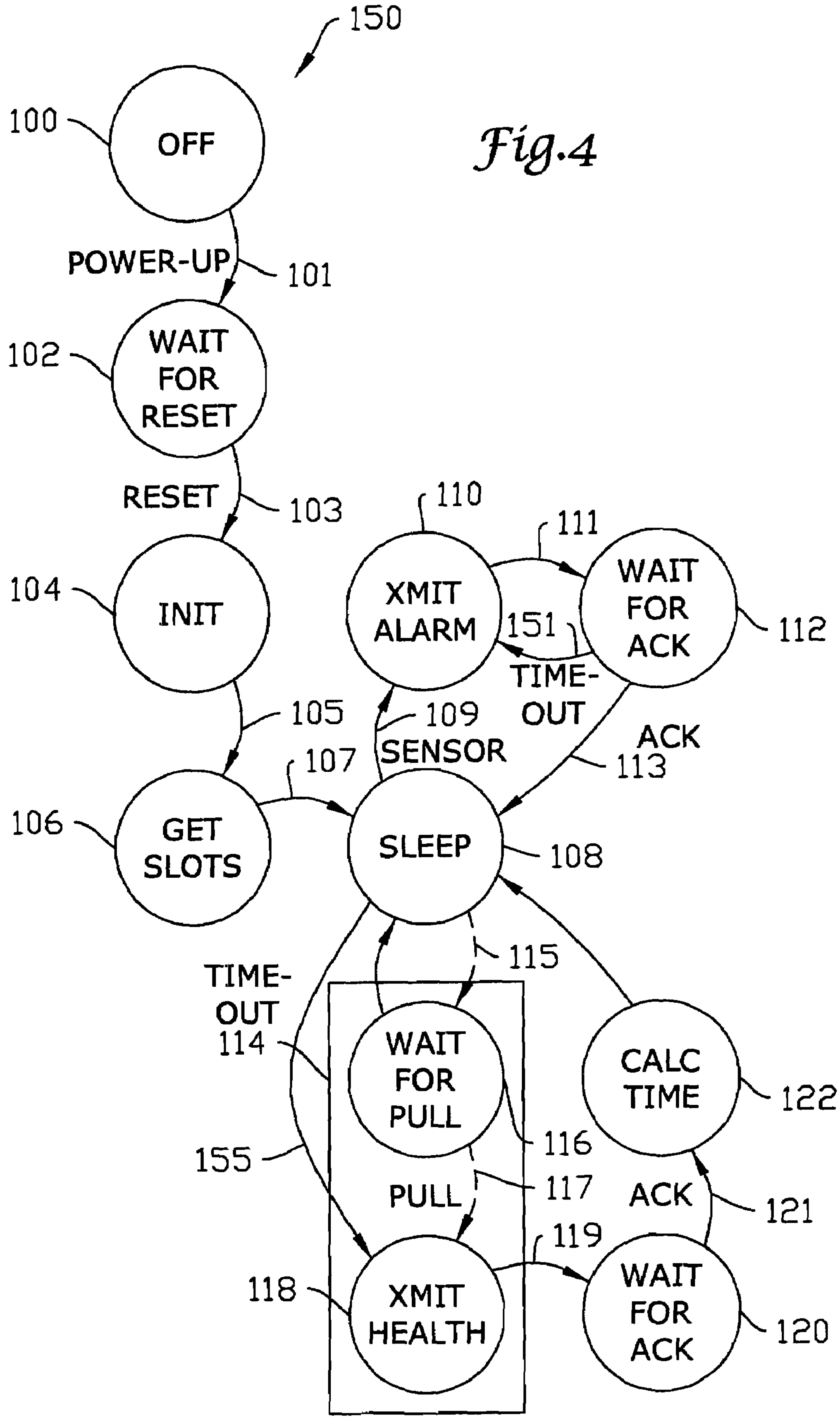
FIG. 4 is a state transition diagram of a process which can execute in a remote unit.

Referring now to FIG. 4, one method, process, or algorithm 150 according to the present invention is illustrated in a state transition diagram. Process 150 can be used for operating a remote unit such as remote unit 50 illustrated in FIG. 2. Process 150 can start with an OFF state 100, where the remote unit is powered down, for example with a dead or removed battery. Upon application of power, such as installation of a battery, a POWER-UP event 101 can be sensed by the microprocessor or external circuitry, causing a transition to a WAITING FOR RESET state 102. A reset button is installed in many remote units for the purpose of allowing re-initilization of the remote unit by the person installing the unit. In one embodiment, reset can also be accomplished via software, which can be useful if the remote ever becomes confused or has not heard from the master unit for a long time period utilizing a watchdog timer. A RESET event 103 can cause a transition to an INITIALIZING state 104. While in INITIALIZING state 104, typical initialization steps can be executed, such as performing diagnostics, clearing memory, initializing counters and timers, and initializing variables. Upon completion of initialization, indicated at 105, transition to a GETTING SLOTS state 106 can occur. GETTING SLOTS state 106 is discussed in greater detail below, and can include receiving a time slot for communication with the master and receiving frequency slots for transmitting to, and receiving from, the master. In one embodiment, the frequencies to utilize in the next transmission and the time remaining to the next transmission are determined or obtained by the remote unit in the GETTING SLOTS state. Upon completion of the GETTING SLOTS state, indicated at 107, the process transitions to a SLEEPING state 108.

SLEEPING state 108 is preferably a very low power consumption state in which the transceiver is able to neither transmit nor receive. In SLEEPING state 108, the controller circuitry or microprocessor is preferably in a very low power consumption state as well. While in SLEEPING state 108, the remote unit should be able to be awakened by timer interrupts or device sensor interrupts. In a preferred embodiment, the remote unit stays in SLEEPING state 108 indefinitely until awakened by an interrupt. Upon reception of a SENSOR event 109, a transition to a TRANSMITTING ALARM state 110 can occur. During this transition or soon thereafter, the transceiver can be switched to a transmit mode. While in this state, an alarm transmission is performed, for example, on the transmission frequency determined in GETTING SLOT state 106. While in this state, transmission of other status or security information can also be performed. For example, the remote unit can transmit the length of time a contact has been open or the current battery voltage. Upon completion of transmission, indicated at 111, a WAITING FOR ACKNOWLEDGE state 112 can be entered. While in this state, the transceiver can be switched to a receive mode at a receive frequency determined during GETTING SLOT state 106. While in this state, the remote is typically in a higher power consumption state relative to SLEEPING state 108. Upon reception of an ACKNOWLEDGEMENT from the master unit, indicated at 113, the remote unit can enter SLEEPING state 108 again. If an acknowledge is not received within a TIMEOUT period, indicated at 151, the alarm can be transmitted again, in TRANSMITTING ALARM state 110. A number of re-transmissions can be attempted. The bi-directional nature of the remote units allows use of the acknowledgement function. The acknowledgement feature can remove the requirement of some current systems that the remote unit broadcast alarms at high power, repeatedly, and for long time periods. Current systems typically do not have remote units that know when their reported alarm has been received, thus requiring repeated transmissions and high power transmissions, even when a low powered, single alarm transmission by the remote could have been or had, in fact, been received.

SLEEPING state 108 can also be exited upon reception of a TIMEOUT event 115. In one embodiment, a timer is loaded with a time period determined during GETTING SLOT state 106. In one embodiment, a time to wait until transmitting status information, such as 300 seconds, is received from the master unit during GETTING SLOT state 106. The time to wait can either be used directly or adjusted with a margin of error to insure that the remote unit is not sleeping when the time period has elapsed. For example, a 360 second time to wait can be used in conjunction with a 5 second margin or error to awaken the remote unit for a receiving period from 355 seconds to 365 seconds. After reception of a TIMEOUT event 115, a status communicating step 114 can be executed, which can include setting the transceiver to either a transmit or a receive mode, discussed below.

In one embodiment, a WAITING FOR POLL state 116 can be entered, and the transceiver is set to a receive state at a receive frequency. In this embodiment, the remote does not transmit health status until polled by the master unit. The remote can remain in WAITING FOR POLL state 116 until time elapses, whereupon the remote unit can return to SLEEPING state 108 until the occurrence of the next time period has lapsed. Alternatively, during the WAITING FOR POLL state 116, the master may transmit a wait instruction that simply indicates that the remote should return to the SLEEPING state 108 for a predetermined period of time. This type of instruction can be used, for example, when the data provided by a particular sensor is no longer needed or is less important in the current system mode. It is contemplated that the system mode can be changed on the fly, whereby the particular sensor may again be polled more often.

In one method, a POLL REQUEST 117 is received from the master unit and the remote unit transitions to a TRANSMITTING HEALTH state 118. While in the TRANSMITTING HEALTH state 118 or soon before, the remote unit transceiver can be put into a transmit state at the desired frequency. In one embodiment, the poll request includes the desired transmit frequency to use.

The health status and sensor data and sensor type of the remote unit can be transmitted. In one embodiment, a simple signal can be transmitted containing little information. In another embodiment, more information is included in the transmission. Information that can be transmitted includes remote unit ID, battery voltage, received master unit signal strength, and internal time.

In some embodiments, sensor data is included in the TRANSMITTING HEALTH transmission. For example, in a room temperature sensor, the temperature can be transmitted as part of the health or status message. In this way, the periodic message used to insure that the remote unit is still functioning can also be used to log the current data from the sensors. In some embodiments, the data is too energy intensive to obtain and only remote unit health information is transmitted. After completion of the TRANSMITTING HEALTH state 118, indicated at 119, a WAITING FOR ACK state 120 can be executed. A WAITING FOR ACK state is executed in some embodiments to await an acknowledgement and/or a synch signal. A synch signal can be used to reset an internal timer to be used in determining the next time to awake from SLEEPING state 108. A synch signal can be used to prevent small remote unit timer inaccuracies from accumulating into large inaccuracies over time and allowing the remote unit timing to drift from the master unit timing. In some embodiments, an acknowledge signal received from the master unit is used to reset the time interval used by timeout event 109. In some embodiments, the acknowledge signal includes a new time and/or frequencies to be used by the remote unit for the next SLEEPING state and transmission and receiving states. In this way, the master unit can maintain close control over the next health transmission time and the next receiving and transmitting frequencies. After reception of the ACK or synch signal indicated at 121, a CALCULATING NEW TIME state 122 can be executed, for determining a new time to be used to determine the timing of event 115.

In one method according to the present invention, after expiration of a timer, a TIMEOUT event 155 occurs which can lead to execution of TRANSMITTING HEALTH state 118 rather than WAITING FOR POLL state 116. After occurrence of event 155, the remote unit can immediately transmit health data. In some embodiments, new transmission times, transmission frequencies, and flags indicating whether to wait for master unit polling are included in acknowledge or synch messages transmitted from master to remote.

Execution of TRANSMITTING HEALTH state 118 and subsequent state are as previously described. In one embodiment, the decision of whether to generate TIMEOUT event 115 or 155 can be made in the remote, in response to a message received from the master. The process utilizing event 155 is preferred. The process utilizing event 115 is illustrated as an alternative embodiment suitable for some applications.

Remote units utilizing the present invention can thus remain asleep in a very lower power consumption mode, neither receiving nor transmitting. One aspect of the present invention making this possible is the coordination of timing between master and remotes. Specifically, when the remote awakes and is able to receive over a window of time, the master should know the start time and time width of that time window to be able to transmit within that window if such a transmission is desirable. Specifically, when the master has allocated a time slot or window for receiving the health of a particular remote unit, that particular unit should transit its health within that time window in order to be heard.

Coordination between master and remotes can include coordination of what frequencies to use, whether a transmission has been received, what time interval to transmit health data in, and when to begin transmitting the health data. This coordination is preferably obtained with communication between master and remote units. In particular, communication from master to remote can establish which frequencies to use, when to transmit health data, and whether the last transmission of a remote was received by the master. The fact that this data can be received by the remote means that the remote can react by changing to a different transmitting frequency, changing to a different transmitting power, changing to a different effective time interval or time interval start, and can re-transmit in the absence of an acknowledgment from the master unit. With the time windows for periodic transmission of health data established between remote and master, the remote can sleep in a very low power mode for a high percentage of the time, changing to a higher power mode only to transmit sensor changes and to periodically transmit health or sensor data.

In one embodiment, only the master unit is aware of the overall timing or scheduling scheme of the system, with the remotes being aware only of the time until the start of the next scheduled remote unit TRANSMITTING HEALTH state or the time until the start of the next remote unit WAITING FOR POLL period. In this embodiment, the amount of processing power required in the remote is held down while only the master is aware of the overall scheduling of time slots.

Adding receivers to the remote units allows adjustment of frequencies in response to communication difficulties. In a typical building installation, remote units are installed near doors and windows and a master unit is installed, often in a central location. Over time, especially in a commercial building, furniture, walls, doors, and dividers are added, which can attenuate RF radiation transmitted through the building, between remote and master units. Reflections can also occur, causing Raleigh cancellation at certain frequencies, greatly reducing the effectiveness of communication at certain frequencies at certain locations, such as in corners. Using bi-directional communication between master and remote units allows adaptive selection of frequencies over time without requiring any work in the field with either master or remote units.

Figure 5:
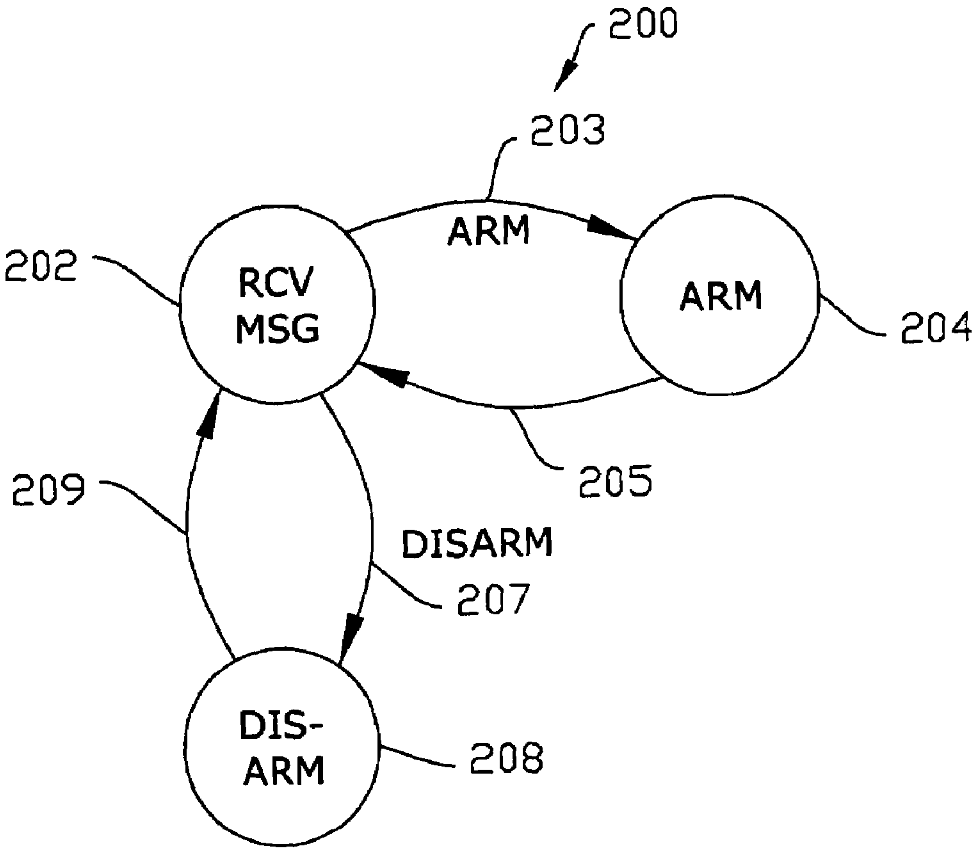
FIG. 5 is a state-transition diagram of a process which can execute in a remote unit for arming and disarming a remote device.

Referring now to FIG. 5, another aspect of the invention is illustrated in an arm-disarm process 200. The process can begin in a RECEIVING state 202. Any receiving state should be suitable to serve as receiving state 202. In one embodiment, a receiving state immediately after a periodic health status transmission is used as a receiving state. In one embodiment, a receiving state immediately after a sensor change transmission is used as a receiving state. In another embodiment, a periodic WAITING FOR POLL state is used as a receiving state. Upon receiving an ARM message 203, an ARMING state 204 is entered during which the security device can be armed. “Arming” a security device can refer to various processes for various devices. In general, arming a device refers to making some aspect of the device active, and often refers to making a device active where the active device consumes more power than the inactive device. Referring again to FIG. 5, when a DISARM message 207 is received by the remote unit, a DISARMING state 208 is entered and the device disarmed. When disarming processing is done, indicated at 209, RECEIVING state 202 can be returned to.

One reason for disarming a device is to conserve power in a remote battery powered device. Some devices, such as continuity switches may use only a small amount of power when active. Other devices, such as infrared motion detectors may use a larger amount of power when active. In either case, some power can be conserved by disarming the device to an inactive state. When a building or house is occupied, it may be desirable to disarm many if not all of the security devices.

One reason for disarming a device is to reduce the number of alarm event transmissions made by the device. This can reduce RF traffic and also conserve battery life, as power is not used for transmitting messages as often. In one example, door switches are disarmed during the day on doors that are to be in use, and are armed during the evening, when the building is closed and secured. In another example, some higher power devices are armed only when verification is required. For example, a remote microphone device may be armed only when listening to follow up on a motion detector alarm or a door open alarm, or a temperature measuring device may only be armed when a temperature reading is desired, and disarmed the remainder of the time.

Figure 6:
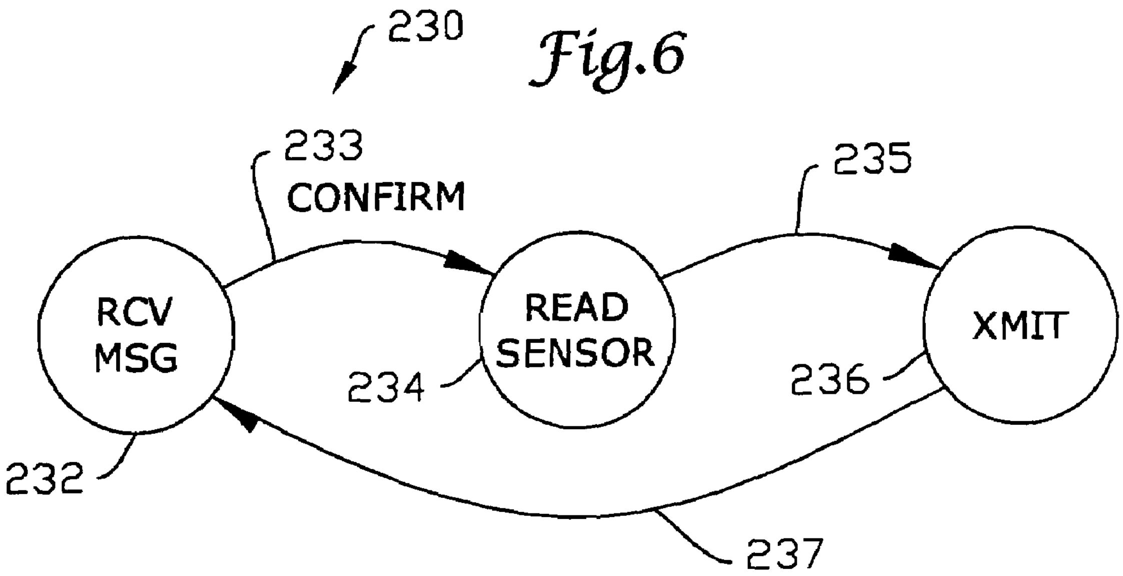
FIG. 6 is a state-transition diagram of a process which can execute in a remote unit for handling confirmation requests by a master unit.

Referring now to FIG. 6, an alarm confirmation aspect of the invention is illustrated in a conformation process 230. Process 230 can be used when reconfirmation of a previous message or event is desired. While in a receiving state 232, reception of a CONFIRMATION or RE-READ message 233 can cause a transition to a READING SENSOR or RE-READING SENSOR state 234 in which a sensor is read or polled to determine its value. Upon completion of reading the sensor, indicated at 235, a TRANSMITTING DATA state 236 can be executed in which the desired data is transmitted to the master unit. Upon completion of transmission, indicated at 237, a RECEIVING state can be entered again. In preferred embodiments, completion of transmission requires reception of an acknowledgement message from the master controller.

Confirmation or re-read requests as illustrated in FIG. 6 can serve to greatly reduce the number of false alarms issued by a security system. In one example, when an alarm event is received by the master unit, the type of sensor is looked up by the master unit, or in some embodiments, is included in the message transmitted by the remote device. In the master unit, a lookup table is used in one embodiment to determine whether confirmation should be requested, how soon, and for what number of repetitions. In one example of the invention, a message is received from a remote unit indicating the opening of a window. The lookup table for that type of device indicates that two readings are required and that the second reading should be taken in 0.5 seconds. The acknowledgment message to the remote includes a reconfirmation request. The remote unit reads the window sensor again after 0.5 seconds and transmits the value to the master unit. The master unit can then report out that the window opened if both readings agree. In the case of a motion detector, a set number of readings over a set time period may be required to report motion to a central reporting service.

In some embodiments, a local alarm is sounded for a grace period to allow an occupant to reset the alarm panel before sending an alarm to a central location. In some embodiments, each type of security sensor type is given a weight and a total weight threshold must be crossed before an alarm is reported. For example, a motion detector and either a door opening or a window opening is required to report an intrusion, or at least two different motion detectors must be tripped before an alarm is reported to a central agency. In another example, each alarm event can be given a weight and the system as a whole can have weight decayed or removed over time. In one example, each motion detecting event is given 1 point and each door opening event given 5 points, with the system removing 1 point per 60 seconds, with 6 points required to report out an alarm. The intelligence can be programmed or configured into a master unit, and changed from time to time, without requiring physically or locally changing the programming of the remote units. The system, master unit, and remote unit programming or configuring can be varied from application to application as well. This can be a function of the level of security desired and the relative costs of false alarms to the user.

Having thus described the preferred embodiments of the present invention, those of skill in the art will readily appreciate that the teachings found herein may be applied to yet other embodiments within the scope of the claims hereto attached.

What is claimed is:

1. A building monitoring and control and control system utilizing bi-directional radio frequency communication comprising:

at least one master unit including a radio frequency transmitter and receiver; and a plurality of remote units having a radio frequency transmitter and receiver, the remote units capable of transmitting to and receiving from the master unit of the building monitoring and control system, the remote units having a first low power consumption state in which the remote units can neither receive nor transmit, a second power consumption state in which the units can receive, and a third power consumption state in which the units can transmit;

means for validating a sensor event, the means for validating including means for requesting reading of the sensor initiated by the master unit and means for reading the sensor by the remote unit responsive to the means for requesting;

wherein the plurality of remote units comprises sensors for detecting one or more of temperature, pressure, humidity, air flow, BTU's, water, damper position, valve position, light, smoke, CO, $CO_2$, movement, noise, vibration, glass breakage, window opening or closure, door opening or closure, or water flow;

wherein the remote units have a reading sensor state in which the sensors are read by the coupled remote units, wherein the reading sensor state is entered in response to a read message received from the master unit;

wherein the means for validating includes means for transmitting sensor data from the remote unit to the master unit wherein the means for validating sensor data includes at least two different validation processes; and the means for validating includes means for identifying the sensor and means for determining which of the validation processes to use depending on the identified sensor.

2. A building monitoring and control system according to claim 1, wherein at least some of the remote units comprise actuators.

3. A building monitoring and control system as recited in claim 2, wherein:

the remote units have an armed state in which the sensors are active and able to measure sensor variables, and a disarmed state in which the remote units are unable to transmit messages; and the remote units have means for switching between the armed and disarmed states, and wherein the means for switching between the armed and disarmed states is responsive to a message received from the master unit.

4. A building monitoring and control system as recited in claim 3, wherein the remote units are unable to measure at least some sensor variables while in the disarmed state.

5. A building monitoring and control system as recited in claim 3, wherein:

the remote unit includes a controller logically coupled to the receiver;

the means for switching between the armed and disarmed states passes the message from the receiver to the controller, processes the message in the controller, executes arm instructions in response to an arm message, and executes disarm instructions in response to a disarm message; and the disarm instructions prevent the sensor change messages from being transmitted.

6. A building monitoring and control system according to claim 1, wherein the second and third states have higher power consumption than the first state.

7. A building monitoring and control system according to claim 6, wherein the remote units are in the receive state only at predetermined intervals.

8. A building monitoring and control system as recited in claim 7, wherein in normal operation the remote units are in the receive state only after being in the transmit state.

9. A building monitoring and control system as recited in claim 8, wherein the remote units are in the receive state and await an acknowledgment from the master unit only after being in the transmit state.

10. A building monitoring and control system as recited in claim 7, wherein the remote units transmit messages at periodic intervals.

11. A building monitoring and control system as recited in claim 7, wherein the remote units transmit messages after a predetermined event for a discrete period of time and then await an acknowledgment of the message transmission.

12. A building monitoring and control system as recited in claim 11, wherein after the remote units receive the acknowledgment, the remote units do not further transmit the transmitted message.

13. A building monitoring and control system as recited in claim 1, wherein the validation processes waits a predetermined time before requesting an additional sensor reading and the predetermined time to wait is dependent on the identified sensor.

14. A building monitoring and control system as recited in claim 1, wherein:

the means for validating includes an indication of whether to request an additional sensor reading; and the indication of whether to request the additional reading is dependent on the identified sensor.

15. A method for communicating between a remote unit and a master unit in a radio-frequency building monitoring and control system, wherein:

the remote unit is capable of transmitting to and receiving messages from the master unit of the building monitoring and control system;

the remote unit has a non-communicating low power consumption state in which the remote unit can neither receive nor transmit, a receiving state in which the remote unit can receive, and a transmitting state in which the remote unit can transmit;

the remote unit has at least one sensor for producing a sensor change event; and wherein the at least one sensor may be for detecting temperature, BTU's, pressure, humidity, air flow, water, damper position, valve position, light, smoke, CO, $CO_2$, movement, noise, vibration, glass breakage, window opening or closure, door opening or closure, or water flow;

the method comprises:

waiting for the sensor change event while in the non-communicating state;

entering the transmitting state and transmitting a message upon detecting the sensor change event;

entering the receiving state and waiting for acknowledgment of the data transmission;

validating the sensor event, wherein the validating step comprises:

receiving a request for a sensor re-read from the master unit, and the remote unit responding to the sensor re-read request by reading the sensor and transmitting a message to the master unit:

wherein validating sensor data step includes at least two different validation processes;

the validating step further comprising identifying the sensor, and determining which of the validation processes to use depending on the identified sensor; and returning to the waiting for sensor change step.

16. A method as recited in claim 15, further including:

changing to a disarmed state upon reception of a disarm message from the master unit, wherein, while in the disarmed state, the remote unit does not, in combination, both sense sensor data from the sensor and transmit sensor data; and changing to an armed state upon reception of an arm message from the master unit, wherein, while in the armed state, the remote unit does, in combination, sense sensor data from the sensor and transmit sensor data.

17. A building monitoring and control system utilizing bi-directional radio frequency communication comprising:

at least one master unit including a radio frequency transmitter and receiver; and a plurality of remote units each having a radio frequency transmitter and receiver; and wherein:

the remote units are capable of transmitting to and receiving from the master unit of the building monitoring and control system and capable of generating polling events in response to a poll message received from the master unit;

the remote units each have at least one timer for generating a timeout event;

the remote units each have at least one sensor for measuring selected variables;

the selected variables comprise temperature, pressure, humidity, air flow, water, BTU's, damper position, valve position, light, smoke, CO, $CO_2$, movement, noise, vibration, glass breakage, window opening or closure, door opening or closure, or water flow;

the remote units are capable of generating a sensor event in response to a sensor change of measurement; and the remote units each have a non-communicating state with low power consumption and in which the remote units can neither receive nor transmit, and a receiving state having higher power consumption than the non-communicating state and in which the units can receive, and the selected remote units are in the receiving state only after selected event occurrences;

the selected events are selected from the group consisting of timeout events, polling events, and sensor events;

wherein the remote units have a reading sensor state in which the sensors are read by the coupled remote units, wherein the reading sensor state is entered in response to a read message received from the master unit;

the system further including means for validating a sensor event, the means for validating including means for requesting reading of the sensor initiated by the master unit and means for reading the sensor by the remote unit responsive to the means for requesting;

the means for validating includes means for transmitting sensor data from the remote unit to the master unit;

wherein the means for validating sensor data includes at least two different validation processes; and the means for validating include means for identifying the sensor and means for determining which of the validation processes to use depending on the identified sensor.

18. A building monitoring and control system as recited in claim 17, wherein:

the remote units each have a transmitting state in which the remote unit can transmit and in which power consumption is higher than in the non-communicating state; and the polling event causes the remote unit to enter the transmitting state followed by entering the receiving state.

19. A building monitoring and control system as recited in claim 17, wherein:

the remote units each have a transmitting state in which the remote unit can transmit and in which power consumption is higher than in the non-communicating state;

the sensor event causes the remote unit to enter the transmitting state followed by entering the receiving state; and the sensor event is caused by a change in a measured variable.

20. A building monitoring and control system as recited in claim 17, wherein the remote units comprise actuators.

21. A building monitoring and control system as recited in claim 20, wherein the actuators may comprise opening, adjusting and closing valves, dampers, blinds, sprinklers, or heating control.

22. A building monitoring and control and control system utilizing bi-directional radio frequency communication comprising:

at least one master unit including a radio frequency transmitter and receiver; and a plurality of remote units having a radio frequency transmitter and receiver, the remote units capable of transmitting to and receiving from the master unit of the building monitoring and control system;

wherein the plurality of remote units comprises sensors for detecting one or more of temperature, pressure, humidity, air flow, BTU's, water, damper position, valve position, light, smoke, CO, $CO_2$, movement, noise, vibration, glass breakage, window opening or closure, door opening or closure, or water flow;

wherein the remote units have a reading sensor state in which the sensors are read by the coupled remote units;

wherein the reading sensor state is entered in response to a read message received from the master unit, the system including means for validating a sensor event, the means for validating including means for requesting reading of the sensor initiated by the master unit and means for reading the sensor by the remote unit responsive to the means for requesting;

the means for validating includes means for transmitting sensor data from the remote unit to the master unit;

wherein the means for validating sensor data includes at least two different validation processes; and the means for validating include means for identifying the sensor and means for determining which of the validation processes to use depending on the identified sensor.

* * * * *